United States Patent [19]

Siedenstrang et al.

[11] 4,370,189
[45] Jan. 25, 1983

[54] MODIFYING THERMOPLASTIC MATERIALS AND PRODUCTS THEREOF

[75] Inventors: Roy W. Siedenstrang, Akron; Agmund K. Thorsrud, Bath, both of Ohio

[73] Assignee: Phillips Petroleum Company, Bartlesville, Okla.

[21] Appl. No.: 217,069

[22] Filed: Dec. 16, 1980

[51] Int. Cl.$^3$ ............................................. B29C 19/02
[52] U.S. Cl. ............................. 156/272.2; 428/515; 428/517; 428/494; 204/159.17; 264/25
[58] Field of Search ............... 428/515, 517, 494, 495; 156/272; 204/159.17; 264/25

[56] References Cited

U.S. PATENT DOCUMENTS

| 3,650,874 | 3/1972 | Job et al. ............................. 428/494 |
| 4,188,769 | 2/1980 | Bright, Jr. ............................. 156/272 |
| 4,253,898 | 3/1981 | Rinker et al. ................... 204/159.17 |
| 4,288,399 | 9/1981 | Siedenstrang et al. ............... 264/25 |

FOREIGN PATENT DOCUMENTS 51-55382  5/1976  Japan .................................. 428/517

OTHER PUBLICATIONS

Cagle, *Handbook of Adhesive Bonding*, pp. 10-1 to 10-8 (1973).

Primary Examiner—George F. Lesmes
Assistant Examiner—Beverly K. Johnson

[57] ABSTRACT

In accordance with the present invention, at least two sheets of a thermoplastic polyalkene are bonded to one another to form a bonded product and at least one surface of a polyalkene is formed on at least a part of a synthetic nonhydrogenated, unvulcanized elastomeric product to form a bonded product by disposing the sheets of polyalkene or at least one sheet of polyalkene on the synthetic elastomeric product, as the case may be, in a mold, closing the mold and subjecting the assembly to microwave energy at a power level, for a time and while applying a pressure sufficient to bond the two polyalkene sheets or the polyalkene sheet to the synthetic elastomeric material, as the case may be.

22 Claims, No Drawings

MODIFYING THERMOPLASTIC MATERIALS AND PRODUCTS THEREOF

BACKGROUND OF THE INVENTION

The present invention relates to a method of modifying thermoplastic materials and products thereof.

A wide variety of polymers and resins of either natural or synthetic origin are available at the present time. Each of these materials possesses its own peculiar properties which make it useful for various purposes and for the production of various products. However, there are certain end uses and products made from polymers and resins which desirably possess the properties of more than one polymer or resin. Certain properties can be added to the inherent properties of the polymer or resin by a wide variety of techniques. However, all such known techniques have one or more disadvantages. Properties of two or more polymers or resins can be obtained by blending or "alloying" two or more polymers or resins. However, in such instances, such blending often masks or destroys one or more desirable inherent properties in the process of attaining an additional property not inherent in the original materials. In addition, it is often quite an expensive proposition to blend several resins simply to attain one additional property because of the added cost of the additional resin and the processing to incorporate the additional resin. Additional properties can be added to the inherent properties of a polymer or resin by the use of a variety of additives. Here again, essentially the same problems are encountered as in the blending of polymers or resins to the extent that the additives often mask or destroy certain inherent properties of the polymer or resin and add to the cost because of the cost of the additive itself and the incorporation thereof in the polymer or resin. One obvious way of combining the properties of two or more resins or polymers, particularly where only the surface properties of one of the materials is to be altered, is by laminating two or more different polymers or resins. It would also appear obvious that two different thermoplastic polymers or resins could be readily laminated by simply applying heat and pressure. However, because of the widely varying properties of polymers and resins including even those which are thermoplastic, such simplistic solutions do not often exist. Consequently in order to laminate different polymers and resins it is necessary to resort to a variety of procedures all of which add to the expense because of additional steps, additional materials, etc. and in many cases alter the physical properties which one desires to retain. For example, in many cases it is necessary to utilize an adhesive in order to obtain an adequate bond between two different resins. In still other cases the polymer or resin itself is modified to make it compatible or to permit bonding by the application of heat and pressure alone. In still other cases a vulcanizing agent, such as sulfur, is utilized between the two materials and heat and pressure are applied in order to vulcanize the materials and thus produce an adequate bond. Obviously, all of these procedures have disadvantages, not the least of which are the additional processing time, the additional processing steps and the additional materials required.

For example, rubbers and elastomers of either natural or synthetic origin possess highly desirable properties which make them useful for an extremely large number of end uses and products. Obviously, resiliency is a primary desirable property. However, appearance (usually a dull rather than shiny appearance), the feel or nonskid surface properties which can be impacted, as well as other physical properties are also quite important in certain end uses. However, rubbers and elastomers also have a number of deficiencies which limit their usefulness. For example, one significant drawback of many rubbers and elastomers is that they are not resistant to chemicals, particularly oils, greases, organic solvents and the like. In addition, rubbers and elastomers usually are not ozone, ultraviolet or weather resistant. While these properties can be imparted to rubbers and elastomers by blending various polymers or resins therewith, or the use of additives, such an approach has been found to be quite expensive, and more complex than is justified by demand for the additional property.

By contrast, thermoplastic polyalkenes do possess many of the above mentioned properties which are not generally possessed by rubbers and elastomers. Specifically, polyalkenes generally are chemical resistant, particularly resistant to oil and grease. As a matter of fact, such polyalkenes are often superior to the so-called oil resistant rubber compounds (based on nitrile rubber, chloroprene, etc.) since the latter will always absorb some oil into the surface thus making cleaning difficult even in cases where the removal of ordinary dirt is involved. By contrast the slick, nonporous, nonchemical-absorbing polyalkene surfaces are very easy to clean. Also, the addition of materials such as carbon black to polyalkenes will render the polyalkene ozone, ultraviolet light and weather resistant. However, the very property which makes polyalkenes desirable from the standpoint of chemical resistance, namely the slick, nonporous surface, makes it undesirable for many uses since such a surface is often slippery and a shiny appearance is not desired at times.

It would therefore be ideal if the desirable properties of thermoplastic polyalkenes could be combined with the desirable properties of rubber and elastomers without materially altering the properties of the rubber or elastomer and doing so in a simple and effective way. However, to date, methods of combining thermoplastic alkenes with rubbers or elastomers leave much to be desired. For example, the usual use of adhesives and vulcanization has heretofore been suggested. In addition it has also been suggested that specific elastomers, namely, hydrogenated block copolymers of high molecular weight derived from conjugated dienes, e.g., 1,3-butadiene and a monovinyl-substituted aromatic compound, e.g., styrene, can be laminated with polyalkenes. The disadvantages of these suggestions are self evident.

SUMMARY OF THE INVENTION

It is therefore an object of the present invention to overcome the above mentioned and other shortcomings of the prior art.

Another object of the present invention is to provide an improved method for forming a polyalkene surface on at least a portion of a synthetic elastomeric material.

Yet another object of the present invention is to provide an improved method for forming a polyalkene surface over the entire outside of a synthetic elastomeric material to thereby encapsulate the same.

A further object of the present invention is to provide an improved method for making a synthetic elastomeric material chemical resistant.

Yet another object of the present invention is to provide an improved method for making a synthetic elastomeric product resistant to grease, oil and organic solvents.

Another and further object of the present invention is to provide an improved method for making a synthetic elastomeric product ozone, ultraviolet and weather resistant without the use of additives.

Still another and further object of the present invention is to provide an improved method of bonding two polyalkene surfaces together.

These and other objects of the present invention will be apparent from the following detailed description.

In accordance with the present invention a polyalkene surface is formed on at least a part of a synthetic elastomeric product by disposing a sheet of a polyalkene in a mold, disposing a body of a synthetic elastomeric material on said sheet of polyalkene, closing said mold and subjecting the assembly to microwave energy at a power level, for a time and while applying a pressure sufficient to bond the polyalkene sheet to the synthetic elastomeric material. In accordance with another aspect of the present invention, a synthetic elastomeric product is encapsulated by a polyalkene by disposing a first sheet of a polyalkene in a mold, disposing a body of a synthetic elastomeric material having dimensions smaller than the dimensions of the first sheet of polyalkene on the first sheet of polyalkene so that the sheet of polyalkene extends beyond the periphery of the body of elastomeric material on all sides, disposing a second sheet of polyalkene having dimensions essentially the same as the first sheet of polyalkene on top of the synthetic elastomeric material, closing the mold and subjecting the resultant assembly to microwave energy at a power level, for a time and while applying a pressure sufficient to bond the first and second sheets of polyalkene to the synthetic elastomeric material and to seal the first and second sheets of polyalkene to one another about the periphery of the synthetic elastomeric material. In yet another aspect, the present invention relates to a method of bonding at least portions of a first and a second body of polyalkene to one another comprising disposing the first body of polyalkene in a mold, disposing the second body of polyalkene in the mold in contact with the first body of polyalkene, closing the mold and subjecting the assembly to microwave energy at a power level, for a time and while applying a pressure sufficient to seal the first and second bodies of polyalkene to one another.

DETAILED DESCRIPTION

Generally, in the present art a sheet is defined as a flat section of a plastic resin with the length considerably greater than the width and which is 10 mils or greater in thickness and the term "film" is an optional term for sheeting having a nominal thickness not greater than 10 mils. However, in order to simplify the discussion and claims herein, the term "sheet" and "sheeting" will be used to refer to the materials with an extended surface, including both materials of 10 mils or greater in thickness as well as materials of less than 10 mils in thickness.

Polyalkenes referred to herein and utilized in accordance with the present invention include any of the known alpha olefin polymers, such as ethylene, propylene or higher olefin polymers (including homo and copolymers). Thus, polyalkenes may not only comprise homopolymers, such as polyethylene or polypropylene, polybutene or polypentene but also may be copolymers preferably of the plastic (nonelastomeric) type such as the nonelastomeric copolymers of ethylene and propylene. These usually are copolymers in which the propylene content is relatively low, for example, 85 to 98 percent ethylene, the remainder being propylene units. Molecular weight of the polymers may range all the way from about 500 to as much as 2,000,000 or higher, but the major emphasis is placed upon normally solid polymers having molecular weights in excess of about 10,000 and preferably in excess of about 30,000, usually 200,000 to 500,000. In addition to the polyalkenes described, other hydrocarbon polymers of the elastomeric type such as ethylene-propylene-diene terpolymer may be combined with the polyalkenes in minor amounts, depending upon the desired physical properties to be modified by the added ingredient. Similarly, the properties of the polyalkenes can be modified by well known additives, such as antioxidants, stress cracking inhibitors, fillers, pigments and the like.

As was pointed out in the introductory portion hereof, polyalkenes have a number of highly desirable properties. A major desirable property is the resistance of the material to chemicals, particularly to oils, greases and hydrocarbon solvents. In addition, when carbon black is added to the polyalkenes, ozone, ultraviolet light and weather resistance of materials are further improved.

However, among the disadvantages of the formation of articles from polyalkenes, are the conditions and time involved in forming the articles. For example, compression molding of polyethylenes requires temperatures from about 275° to 450° F. (135°–232° C.) and pressures from about 100 to 800 psi, (0.69–5.5 MPa) while injection molding requires temperatures from about 300° to 600° F. (149°–316° C.) and pressures of about 8000 to 30,000 psi (155–207 MPa). Similarly, compression molding of polypropylene requires temperatures of about 340° to 550° F. (171°–288° C.) at pressures of about 500 to 1000 psi (3.4–6.9 MPa), while injection molding requires a temperature of about 375° to 600° F. (191°–316° C.) and pressures of about 10,000 to 20,000 psi (69–138 MPa). In addition, however, such molding operations are extremely time consuming or require costly processing equipment, (injection molding is a speedy operation).

By contrast, the little used techniques of flow molding is advantageous to the extent that reduced pressures are required and there is a reduction in processing steps necessary. In a flow molding process the moldable material in powder, pellet or particle form or in the form of a sheet is placed in a suitable mold, the mold is closed and the moldable composition heated to a temperature just sufficient to melt and cause flow of the moldable material into the intenstices of the mold. However, here again, the heat required to accomplish molding is usually excessive and, in many cases, nonconductivity of the material makes it difficult if not impossible to heat large or thick objects all the way to the center of the object. Recently, a particularly attractive technique of flow molding has been suggested. In accordance with this procedure, the usual flow molding process is carried out except that, rather than using radiant heat to melt and cause flow of the moldable material, microwave energy is utilized. Heating with microwave energy has a number of advantages. To the extent that material being heated responds to microwave energy, it is possible to heat large objects all the way through at a uniform rate and in many instances to heat materials which could not otherwise be conveniently heated. In addition, extremely short periods of time are required to carry out the process as compared with any other heating technique. Further, the short period of time required for heating prevents deleterious effects of heat on the material being molded as well as materials to which they are to be attached. Microwave heating also permits the utilization of inexpensive molds, such as liquid, cast silicone rubber molds. Finally, moderate pressures below about 200 psi are normally used.

By definition the microwave region is that portion of the electromagnetic spectrum lying between the far infrared and the conventional radio frequency portion. While the microwave region is not bounded by definition, it is commonly regarded as extending from 300,000 megacycles to 1000 megacycles (1 millimeter to 30 centimeter in wavelength). In most areas of the world certain frequencies have been assigned for industrial uses of microwave energy. For example, in the United States the assigned frequencies are 915 and 2450 megahertz (MHz). In Europe assigned frequencies are 896 and 2450 MHz and in Japan 40 to 50 MHz. However, it is to be understood that frequencies outside those assigned do in fact produce the same results when microwave energy is used as a heating source. For example, there is little difference in the process used or the product obtained between frequencies of 915 and 2450 MHz. However, the latter requires more shielding and the like to avoid stray radiation contacting operating personnel. Commonly the power required is in the range of 0.5 kw. to 200 kw. or more. Care must be taken in selecting the intensity of the irradiation since too rapid heating, arising from the use of too intense irradiation, may lead to destruction of the product or an inferior product. Preferably, the intensity of radiation is such that approximately 1.5 to 2.3 kw. power per kg. of composition being heated is applied, although intensities outside these limits, for example 0.5 to 5 kw/kg, may in some cases be suitable. Equipment for molding, which utilizes microwave energy as the heating source, is available and is quite simple in construction. Usually a press embodies a fixed supporting platen and a movable upper platen adapted to be moved toward and away from the fixed platen with cables or the like connecting the platens to a suitable source of power to produce a high frequency field between the platens when the movable platen is moved into engagement with the mold resting on a fixed platen so that fusion and application of molding pressure are applied simultaneously. The high frequency heating develops a deep penetration of the part quickly without raising the temperature of the platens substantially so that, when the power source is cut off, the platens will function as heat wells to draw off heat from the mold and thus effect rapid cooling and setting of the part being molded. The molds themselves are quite simple and inexpensive and can be made of any material which is transparent to microwave energy. A highly desirable material is a mold made of silicon rubber, a room temperature vulcanizing material which is characterized in that it will reproduce detail and is inexpensive for making molds.

Where any material capable of responding to microwave energy, rather than reflecting the same or being transparent thereto, is treated with microwave energy, heat is produced as a result. The response of a material to microwave heating and microwave energy is indicated by what is known as a loss factor or a loss index. This loss index is the product of the dielectric constant of the material and the dissipation factor. Unfortunately, very few natural or synthetic resins or plastics respond to microwave energy. In most cases the response is either very poor or nonexistent. Among the plastics which have a loss factor indicating no response to microwave energy are the polyalkenes, particularly polyethylene and polypropylene. Accordingly, the prior art teaches that two polyalkene items such as two items of polyalkene cannot be sealed to one another by the use of microwave heating.

Contrary to these teachings of the prior art, it has been found in accordance with the present invention that polyalkene items and, particularly polyalkene sheets less than about 10 mils in thickness, can be effectively bonded to one another and sealed by subjecting the same to microwave energy in a flow molding apparatus. The reasons for this response of polyalkenes to microwave energy, contrary to the teachings of the prior art is not understood. While it is not intended that applicants be held to any particular theory, it is believed that either the relative thinness, for example below about 10 mils, of the polyalkene sheets and/or the reislience of silicon rubber molds, applying even pressure during the molding, contribute to the successful results. As a point of reference polyethylene sheet material of the thickness normally utilized in garbage bags and the like has been found to be workable in accordance with the present invention.

While, as previously indicated, the compositions of this invention respond well to microwave energy, a polar composition may be added as a microwave sensitizer to further enhance the rsponse to microwave energy. Not all polar compounds have been found effective in enhancing the microwave energy response of the compositions but there are a large number which have been found so effective. For example, a material selected from among simple and polymeric alkylene glycols and their mono- and dialkyl ethers, ethanol amines and isopropanol amines and their hydrocarbyl-substituted derivatives and mixtures thereof have been found particularly useful. Exemplary compounds include ethylene glycol, 1,2-propylene glycol, 1,3-butylene glycol, 1,4-butylene glycol, 1,6-hexylene glycol, diethylene glycol, triethylene glycol, dipropylene glycol, thiodiethylene glycol, etc., polyethylene glycols having average molecular weights ranging from about 200 to 6,000 (commercially available under the tradename "Carbowax" from Union Carbide Corp., New York, N.Y.) polypropylene glycols having average molecular weights from about 400 to about 2,000; mixed poly(ethylene)-poly(propylene) glycols having average molecular weights up to about 6,000 and containing from about 30 to about 90 weight percent ethylene oxide; the monomethyl, monoethyl, and monobutyl ethers of ethylene glycol, propylene glycol and diethylene glycol; the monomethyl and monoethyl ethers of triethylene glycols; the dimethyl and diethyl ethers of diethylene glycol, dipropylene glycol and trimethylene glycol; the alkanolamines and substituted alkanolamines based on ethanol and isopropanol such as mono-, di- and triethanolamine, mono-, di- and triisopropylamine, methylethanolamine, dibutylethanolamine, phenyldiethanolamine, di(2-ethylhexyl)ethanolamine, dimethylisopropanolamine, dibutylisopropanolamine, and the like; and mixtures thereof. Other polar compounds such as acrylonitrile/butadiene copolymers, acrylonitrile/butadiene blends with homopolymers of polyvinyl chloride and styrene/acrylonitrile copolymers are also effective. Other materials suitable as polarizing agents include glyceryl diacetate; di(2-hydroxyethyl) dimethylhydantoin; ionomer resins, particularly with other polarizing agents and polyphenyleneoxidepolystyrene blends. Presently preferred compounds include diethylene glycol and triethanolamine and particularly mixtures thereof and mixtures thereof with polyethylene glycols. A particularly useful sensitizer composition is a 50/50 mixture of triethanolamine and polyethylene glycol of about 540 MW (molecular weight.

The polar agent will generally be utilized in a range of from about 0.5 to about 20 parts by weight per 100 parts by weight of the plastic composition (phr) and preferably about 0.75 to about 10 parts by weight per 100 parts by weight of the plastic composition.

While, as previously indicated, polyalkenes exhibit a number of very desirable characteristics, one of which is chemical resistance, there are also disadvantages which make the use of polyalkenes unsuitable for certain purposes. For example, in the making of drain boards and the like the object is generally stiffer and less resilient than desired. As a matter of fact, any object having a thickness greater than that of the films or sheets (below about 10 mils thick) normally produced will be unduly stiff and unyielding. Also floor mats and the like cannot be made from the polyalkenes because of the slicker, slippery surface of the material. On the other hand, the chemical resistance and ease of cleaning this slippery or slick surface of the polyalkenes would be a desirable advantage in floor mats and the like. By contrast, natural and synthetic elastomers do possess the desirable properties of resilience, the skid resistance and the like which make them most suitable for many purposes. However, except for nitrile rubbers, such elastomers have little or no chemical resistance, particularly to oils and greases, and are either destroyed by chemicals of this nature or swell and become deformed. Even the so-called oil resistant rubbers based on nitriles have been found to absorb some oil, thus making any elastomer unsuitable in such environments.

It has further been found, in accordance with the present invention, that the advantages of the polyalkenes can be simply added to the advantages of natural and synthetic elastomers in a simple, effective and economic manner. Attempts to develop elastomers having the requisite chemical resistance referred to above have been unsuccessful and in any event would be extremely costly to manufacture. On the other hand, it has been found, in accordance with the present invention, that elastomers can be made chemical resistant by forming a polyalkene surface on at least one side of an elastomer product. Specifically, this is accomplished by placing a sheet of the polyalkene in a flow molding apparatus, placing a body of elastomer material, either granules, powder, a sheet or the like, of the elastomer in the cavity of the mold, which is formed to produce the ultimate thickness of the end product as well as to form any pattern or the like on the object, and subjecting the same to heating by microwave energization. When a polyalkene surface is to be formed on one side only of the elastomer, a release sheet is placed on the other side of the elastomer material in the mold. However, when the elastomer is to be completely encapsulated by the polyalkene to make the elastomer completely chemical proof, a second sheet of the thermoplastic polyalkene is placed on top of the body of elastomer in the mold. In both instances the polyalkene sheet adheres quite well to the elastomeric material and in the latter case both sheets of polyalkene adhere well to the elastomeric material and, in addition, the edges of the polyalkene sheets extending beyond the elastomeric body adhere to one another making the elastomeric material completely chemical resistant and sealing around the edges of the elastomeric body.

Any natural or synthetic elastomer may be used in accordance with the present invention. However, the thermoplastic elastomers particularly useful in practicing the present invention are normally solid, block copolymers, characteristically exhibiting high tensile strength and elongation in their natural condition, that is, in their green or unvulcanized state. Particularly useful are linear block or radical teleblock copolymers. More specifically, useful elastomers are radial teleblock copolymers of butadiene/styrene. Such copolymers are described in more detail in U.S. Pat. Nos. 3,823,109; 3,826,776 and 3,959,545. These polymers are prepared by methods well known in the art.

The butadiene/styrene copolymers, discussed above, generally contain about 50 to 90 weight percent butadiene and from 50 to about 10 weight percent of styrene; preferably, from about 50 to 70 weight percent butadiene and about 50 to about 30 weight percent styrene. Copolymers particularly useful in producing compositions in accordance with the present invention are those having from about 60 to about 70 weight percent butadiene. When less than about 10 percent styrene is employed, the resulting copolymers do not possess the requisite green tensile strength. On the other hand, more than 50 weight percent of the styrene in the copolymer results in a composition in which hardness is increased at the expense of elasticity. Useful copolymers will generally exhibit a weight average molecular weight in the range of from about 75,000 to about 500,000 but a range of about 100,000 to about 350,000 is preferable.

It is also within the scope of the present invention to add other polymers to the thermoplastic elastomer in amounts up to about 150 parts by weight of the polymer per 100 parts by weight of the elastomer. Such additional polymers are generally solid resinous polymers of a vinyl-substituted aromatic compound, for example, styrene, alphamethyl styrene, etc., alone or copolymerized with a monomer such as acrylonitrile or a conjugated diene such as butadiene. Such homopolymers and copolymers generally have densities in the range of about 1.04 to about 1.10 gram/cc (ASTM D 792), a tensile strength in the range of from about 5,000 to about 12,000 psi (34.5-82.7 MPa), ASTM D-638, and a Shore A hardness ranging from about 35 to about 95 (ASTM D-2240) at about 23° C.

The previously mentioned thermoplastic elastomers may also have certain amounts of the extender oil incorporated therein during their manufacture. For example, the elastomers may have incorporated therein from 50 to 60 parts by weight of oil. Consequently, the amounts of adder extender oil referred to herein, and specifically in the examples, are amounts in addition to the amounts incorporated in the thermoplastic elastomer during its manufacture and the amounts of elastomer referred to include the weight of the elastomer including the oil added during elastomer preparation. Suitable extender oils include those well known in the art such as naphthenic, aromatic and paraffinic petroleum oils, particularly the naphthenic type.

The thermoplastic elastomer composition may have added thereto at least about 10 parts by weight of extender oil per 100 parts by weight of the thermoplastic elastomer. Preferred amounts of added extender oil include from about 70 to about 350 parts of oil per 100 parts of thermoplastic elastomer and ideally about 250 to about 300 parts of oil per 100 parts of thermoplastic elastomer.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful stabilizers and antioxidants include 2-(2'-hydroxy-5'-methylphenyl)benzotriazole, nickel dibutyldithiocarbamate, zinc dibutyldithiocarbamate, tris(nonylphenyl)phosphite, 2,6-di-t-butyl-4-methylphenol and the like. Exemplary conventional fillers and pigments include silica, carbon black, titanium dioxide, iron oxide and the like. Polypropylene and polystyrene are examples of thermoplastic resins which function as reinforcing agents. A butadiene/acrylonitrile elastomer is an example of an elastomer which functions as a processing aid.

In addition to the above conventional ingredients, the microwave response of these elastomers may be enhanced by adding thereto a solid, hygroscopic filler, having greater than 1 percent by weight, and preferably greater than 4.0 percent by weight, of absorbed water and capable of retaining a substantial portion of such water at temperatures of at least 100° C., such as, bentonite clay, particularly the Western type, wood flour, ground cork, etc., in addition to the usual amounts of the more conventional fillers and pigments. The hygroscopic filler may be utilized in amounts in excess of about 45 parts by weight of filler per 100 parts of thermoplastic elastomer (phr). These amounts do not include the usual amounts of conventional fillers and pigments which can be used. Preferably, the hygroscopic filler is utilized in amounts between about 350 and about 500 parts by weight of filler per 100 parts by weight of thermoplastic elastomer and ideally about 400 parts filler per 100 parts thermoplastic elastomer. Superior products can be produced by employing a particular range of extender oil/hygroscopic filler. Specifically, the desired weight ratios of oil to hygroscopic filler are 0.3 to 3, preferably 0.5 to 1.0 and ideally about 0.75.

The thermoplastic elastomer compositions may be prepared by any means well known in the art for combining such ingredients, such as solution blending, milling, internal batch mixing, or continuous extrusion of a solid form of elastomer and the other ingredients. A rapid and convenient method of preparation comprises heating a mixture of the components to a temperature of about 120° C. to about 205° C., while separate specific embodiments preferably involve stirring a mixture of the components at about 160° C. to about 205° C., preferably about 175° C. to about 205° C. or by heating the mixture without stirring in a temperature range of about 125° C. to about 200° C., preferably about 125° C. to about 165° C. Preferably, the hygroscopic filler is capable of retaining a substantial portion of its absorbed water at temperatures above the melt temperature of the composition (usually about 160° C.) and up to the highest temperature utilized in the preparation of the composition prior to molding.

One method of preparing a composition comprising a conjugated diene/vinyl aromatic block copolymer and extender oil involves placing a mixture of the copolymer and extender oil in suitable container such as a flat metal pan and heating said mixture, such as in an oven, without agitation at a temperature which normally falls within the range corresponding to about the melting point of the elastomer, about 120° C. up to about the flash point of the oil, about 200° C. Normally and preferably, heating is conducted within the range of about 125° C. to about 165° C. The composition can be formed of the mixture within a time of several seconds to several hours but the mixture is normally maintained at this temperature for about 15 minutes to several hours. The time required is dependent upon such things as the type of the elastomer and oil employed, the temperature used and the physical size of the particles of elastomer to be used in preparation of the composition. Furthermore, the time required to make a homogeneous mixture can normally be reduced by physically mixing the rubber and the oil prior to the heating step. Additional additives and formulations can be added to the elastomer-oil blend prior to or during the heating step. After the heating step, the composition is normally cooled prior to use in fabricating articles.

The composition can be further treated if desired or required in any conventional mixer such as a Banbury mixer or roll mill, particularly if small amounts of undissolved elastomer remain after the oven heating step or if it is desirable to add other ingredients prior to or during the heating step and such have not been uniformly distributed. The additional treatment, if desired, is normally conducted within the temperature range of about 75° C. to about 125° C., preferably maintaining the composition below its melting point for a few minutes up to several hours, preferably 3 to 15 minutes. A particularly useful technique is to add the hygroscopic filler in the beginning of the mixing cycle in order to take maximum advantage of heating time and to prevent surface bleeding and overheating when forming the molded articles.

The resultant composition may be in the form of extruded pellets, cut dices, preferably as small as possible since smaller pellets provide short heating times and better flow when utilized in flow molding. Ground pellets may also be utilized. Where large area objects are to be made, such as in the manufacture of mats, the composition may be provided in sheet form in order to shorten the heating time and effect better flow during the molding operation.

It has been found that by utilizing a solid, hygroscopic filler, as previously discussed, reduced time for incorporating extender oil, ease of incorporation and extremely good dispersion are attained. On the other hand, it was found that when using conventional fillers, such as calcium carbonate (whiting) or china clay, particularly at high levels, extremely long mixing times were required and, more importantly, the resultant products were very dry, brittle and completely unusable. Talc, particularly at high loadings, also resulted in unexpectably long mixing times and may produce unacceptably stiff and boardy products. By comparison, products formed from the composition containing the hygroscopic fillers exhibited very good rubberiness and other physical properties.

It has also been found that the composition containing hygroscopic fillers responded much better to microwave energy heating than materials filled with calcium carbonate, Dixie clays, talc, etc. The mixing difficulties with the china-type clay included excessive stickiness in the mixer which made it impossible to conventionally dump the mixed product.

It has also been found that these mixtures respond unexpectedly to heating by microwave energy. It is known that the thermoplastic elastomers, do not, in and of themselves, respond well to heating by microwave radiation. However, the response of the thermoplastic elastomers to microwave radiation is significantly improved by the addition of the hygroscopic fillers. It is believed that the presence and retention of significant amounts of absorbed water by the hygroscopic filler is responsible for such enhancement of the response of the composition to microwave radiation. Consequently, the hygroscopic filler should be capable of retaining a significant amount of its absorbed water at temperatures above the boiling point of water, preferably above the melt temperature of the composition (usually about 160° C.) and up to the temperature utilized in the preparation of the composition for molding and ideally up to the highest temperature reached in the molding operation (generally between about 280° and about 450° F. [138°-232° C.]. If the absorbed water of the hygroscopic filler is driven off during preparation of the mixture for flow molding, the improved response to microwave radiation does not occur, and the advantages during flow molding and of the resultant product, set forth herein, are not attained. In any event, tests have shown that if the hygroscopic fillers are dried before compounding, the receptivity to microwave radiation is significantly reduced. In addition, if the water is driven off during flow molding surface pits and/or porosity in the product result from the evolution of steam. Hence, the compositions containing the hygroscopic fillers, as defined, are not as sensitive to overheating as formulations containing nonhygroscopic fillers with significant amounts of absorbed water which will not be retained during flow molding. The above-mentioned ability to enhance the response to microwave radiation is particularly noticeable at high concentrations of hygroscopic filler.

Undesirable evolution of steam can also be controlled by incorporating in the mixture appropriate amounts (about 5 to about 25 parts by weight and preferably 20 parts by weight) of a waterbinding agent like calcium oxide, preferably in the form of an oil dispersion.

The elastomeric compositions utilized herein also desirably include one or more of the other microwave sensitizers previously discussed and/or others known in the prior art.

The ability of polyalkene films or sheets to completely seal around the edges of the elastomer has even been noted around holes in a perforated product.

In addition to the above, the resultant products have a warm, rubbery feel and appearance which is not noticeably altered by formation of the polyalkene surface on the elastomer product. Unexpectedly, by laminating a thin (about 5 mil thick) low density polyethylene to the elastomer the surface was practically undistinguishable from the surface of an unlaminated molded product under the same conditions and contained all patterns, most of the nonskid properties and even a generally rough surface where the same is intended. As a matter of fact, by casual observation and without testing the surface for chemical resistance, products with and without the polyalkene surface were indistinguishable. Normally elastomers, as defined above, generally have added thereto an ethylene-propylene-diene terpolymer elastomer in order to make the composition ozone, ultraviolet light and weather resistant. However, if a polyalkene containing carbon black is utilized to form a surface on the elastomeric material, the end product possesses ozone, ultraviolet light and weather resistance without the expensive addition of the terpolymer to the elastomeric material. It has also been found that products of any given color can be produced simply by utilizing a polyalkene sheet material of the desired color irrespective of the color of the elastomeric material.

The silicone mold, preferably utilized in microwave flow molding in accordance with the present invention, has the distinct advantage that they are transparent to microwave energy, have no noticeable response thereto, and none of the known sensitizers previously mentioned or known in the art have been found to in any way affect or improve the response. Flow molding utilizing sheets of polyalkene on the bottom and/or bottom and top of the elastomer also have the advantage of protecting the silicone molds which often absorb plasticizers from block copolymer compounds during flow molding. The latter results in weakening of the physical properties of the silicone, especially the cavity surface, which can then be more readily damaged by scratches, etc. Also the exact dimensions of the mold can be effected. Thus, it is usually necessary to clean the mold to remove such plasticizers since their presence will give a greasy surface film on the next product molded. The polyalkene film on the other hand forms a barrier between the elastomeric material and the mold, thus eliminating these problems.

The nature and advantages of the present invention will be illustrated by the following examples. In all of the tests conducted molding was carried out in a 10 kw. 40 MHz laboratory Model J Compofit high frequency flow-molding machine. The output setting utilized was 86.3, microwave energy was applied at 75 psi pressure for 30 seconds and cooling was carried out for one minute. The microamp gauge readings were 0.43 for 6 mil black polyethylene, 0.42 for 5 mil blue polyethylene, 0.42 for 5 mil red polyethylene and 0.42 for 3 mil amber polyethylene. Best results were obtained with a 6 mil black polyethylene such as that commonly used for garden weed control.

EXAMPLE I

A mat was formed utilizing the following composition containing a single block copolymer compound.

TABLE 1

|  | Parts by wt. |
|---|---|
| Butadiene/styrene copolymer(1) | 100 |
| *Ethylene-propylene-diene terpolymer | 50 |
| Silica | 28 |
| Naphthenic oil | 130 |
| Whiting | 275 |
| Bentonite clay | 225 |
| Aromatic petroleum resin | 30 |
| Paraffin wax | 2 |
| Mixed fatty acid soaps, predominantly calcium | 1.5 |
| Alkylated diphenylamine (antioxidant) | 0.5 T |
| Oil-carbon black masterbatch(2) | 8.5 |
| Triethanolamine | 4.0 |
| Polyethylene glycol (about 540 MW) | 6.0 |

(1)70/30 butadiene/styrene radial teleblock copolymer of about 300,000 weight average molecular weight
(2)50 parts oil/100 parts carbon black
*(Available commercially under the trademark of Nordel 1560 from E. I. duPont de Nemours & Co., Inc.

The compound was made in an internal mixer and calendered to sheets 105 mils thick. Commerically available polyethylene 5 mils in thickness was utilized with a sheet of the polyethylene larger than the mold cavity and hence the sheet of elastomer. The sheet of elastomer was placed in the mold cavity and a second sheet of the polyethylene larger than the sheet of elastomer was placed on top and the mold closed and subjected to microwave energy.

The resultant products were subjected to immersion in several fluids for 70 hours at 158° F. and this was compared with similar immersion of polyethylene film alone and a control of the same elastomer formed in the same manner but without encapsulation by the polyethylene. The following table illustrates the results of these comparisons.

TABLE II

| Solvent | Polyethylene Film | Polyethylene Encapsulated Copolymer* | Control Copolymer |
| --- | --- | --- | --- |
| Motor oil | Unaffected | Swells slightly | Swells, softens |
| Brake fluid | Unaffected | No effect | Slight hardening |
| Transmission fluid | Unaffected | Swells, dissolves | Dissolved completely |
| Wesson oil | Unaffected | Unaffected | Unaffected |
| Skin-So-Soft, 10% | Unaffected | Swells, softens | Softens, swells greatly |

*Attack on rubber due to observable incomplete sealing of film edges around elastomer.

It is to be observed that the elastomer alone is subject to degradation in several of the most severe fluids, the polyethylene film (when properly and completely sealed) acts effectively as a barrier to attack by such fluids.

EXAMPLE II

A mat was also formed utilizing the following composition containing three different block copolymer compounds.

TABLE III

| | Parts by wt. |
| --- | --- |
| Butadiene/styrene copolymer[1] | 75 |
| Butadiene/styrene copolymer[2] | 25 |
| Ethylene-propylene-diene terpolymer | 50 |
| Naphthenic oil | 130 |
| Whiting | 275 |
| Bentonite clay | 225 |
| Aromatic petroleum resin | 30 |
| Silica | 25.6 |
| Paraffin wax | 2 |
| Mixed fatty acid soap, predominantly calcium | 1.5 |
| Alkylated diphenylamine (antioxidant) | 0.5 |
| Oil-carbon black masterbatch[3] | 8.5 |
| Triethanolamine | 4.0 |
| Butadiene/styrene block copolymer[4] | 2.4 |
| Polyethylene glycol (about 540 MW) | 6.0 |
| Leather scent | 0.06 |
| | 860.56 |

[1] see footnote (1), Table I
[2] 70/30 butadiene/styrene radial teleblock copolymer having a weight average molecular weight of about 250,000
[3] see footnote (2), Table I
[4] 60/40 butadiene/styrene radial teleblock copolymer having a weight average molecular weight of about 240,000 containing 50 parts naphthenic oil per 100 parts polymer A polyethylene surface was formed on one side of the elastomer with a 6 mil thick black low density polyethylene film commercially available as a weed control material and utilizing the flow molding technique described. Similarly, samples were made in the same manner but utilizing two 2 mil thick beige low density polyethylene films commercially available as garbage can liners on either side of the elastomeric materials.

The polyalkene sheet materials utilized are preferably low density polyethylene having a specific gravity of about 0.919 to 0.921 and a melt index of about 0.5 to 2.0. However by utilizing a polyalkene having a higher specific gravity, e.g., 0.945, it is possible to demold the end products at higher temperatures and thus save further time in the manufacture of the products. As previously indicated, carbon black in the polyalkene will generally improve the ozone, ultraviolet light and weather resistance of the end product. Generally, it is desirable that the polyalkene contain less than about 1 percent carbon black and a nominal level of stabilizer. In a preferred embodiment the thickness of the polyalkene sheets utilized, in accordance with the present invention, is less than about 10 mils and preferably about 5 to 6 mils in thickness.

It is obvious from the above that novel products of an unvulcanized, nonhydrogenated diene/vinyl arene block copolymer having a polyalkene surface formed on at least a part of the surface thereof can be produced without resorting to the use of hydrogenated copolymers. It is also obvious that thermoplastic elastomers can be encapsulated in polyalkenes, thereby making chemical resistant products among numerous other advantages. Mats made in accordance with the present invention can be utilized in any of a number of forms, such as drip mats for automotive use, drain board mats, floor mats, etc. where chemical resistance or an easily cleaned surface is desired. Mats with one side which is skid resistant and one side nonadherent to dirt and other materials can also be made, such as mats which will cling to a car windshield yet resistant to or easily freed of ice or snow, can be made.

While specific examples, materials and procedures have been included herein for illustrative purposes, it is to be understood that these are not to be considered limiting and that numerous variations and equivalents will occur to one skilled in the art.

We claim:

1. A method for forming a thermoplastic polyalkene surface on at least one side of a thermoplastic elastomeric product comprising:
    disposing a sheet of a thermoplastic polyalkene in a mold;
    disposing a body of a nonhydrogenated, unvulcanized and unvulcanizable, thermoplastic elastomeric material atop at least a portion of said sheet of polyalkene;
    closing said mold; and
    subjecting the resultant assembly to microwave energy at a power level, for a time and while applying a pressure sufficient to bond said sheet of polyalkene to said body of elastomeric material and form said body of elastomeric material into an elastomeric product.

2. A method in accordance with claim 1 wherein a second sheet of a thermoplastic polyalkene is disposed on top of the body of elastomeric material.

3. A method in accordance with claim 1 or 2 in which the sheet or polyalkene or at least one of the sheets of polyalkene, as the case may be, extends beyond the periphery of the body of elastomeric material on all sides.

4. A method in accordance with claim 3 wherein the mold has a cavity formed therein having the dimensions and the form of the final elastomeric product and the body of thermoplastic elastomeric material is disposed in said cavity.

5. A method in accordance with claim 1 or 2 wherein the body of elastomeric material is a sheet of elastomeric material.

6. A method in accordance with claim 1 or 2 wherein the sheet or sheets of polyalkene, as the case may be, has a thickness of less than about 10 mils.

7. A method in accordance with claim 1 or 2 wherein the elastomeric material contains a microwave sensitizer in an amount sufficient to decrease the loss factor of the elastomeric material.

8. A method in accordance with claim 1 or 2 wherein the material from which the polyalkene sheet or sheets, as the case may be, is formed contains a microwave sensitizer in an amount sufficient to increase the loss factor of the polyalkene.

9. A method in accordance with claim 1 or 2 wherein the elastomeric material and the material from which the polyalkene sheet or sheets, as the case may be, are formed each contains a microwave sensitizer in an amount sufficient to increase the loss factor of said elastomeric material or said polyalkene, respectively.

10. A method in accordance with claim 1 or 2 wherein the mold is a formed of silicone rubber.

11. A method in accordance with claim 1 or 2 wherein the polyalkene is polyethylene.

12. A method in accordance with claim 1 or 2 wherein the polyalkene is polypropylene.

13. A method in accordance with claim 1 or 2 wherein the elastomeric material is a conjugated diene/vinyl arene block copolymer and the sheet or sheets of polyalkene, as the case may be, has an unmodified microwave energy loss factor and a a thickness of less than about 10 mils.

14. A method in accordance with claim 1 or 2 wherein the elastomeric material is a conjugated diene/vinyl arene block copolymer, the sheet or sheets of polyalkene, as the case may be, has a thickness of less than about 10 mils and the elastomeric material contains a microwave sensitizer in an amount sufficient to decrease the loss factor of the elastomeric material.

15. A method in accordance with claim 5 wherein the elastomeric product is in the form of a mat-type structure.

16. A method in accordance with claim 1 or 2 wherein the sheet or sheets of polyalkene, as the case may be, has an unmodified microwave energy loss factor.

17. A method in accordance with claim 1 or 2 wherein the elastomeric material is a conjugated diene/vinyl arene block copolymer.

18. A method in accordance with claim 17 wherein the sheet or sheets of polyalkene, as the case may be, has an unmodified microwave energy loss factor.

19. A method in accordance with claim 17 wherein the elastomeric material contains a microwave sensitizer in an amount sufficient to decrease the loss factor thereof.

20. A method in accordance with claim 17 wherein the sheet or sheets of polyalkene, as the case may be, have a thickness of less than about 10 mils.

21. A method in accordance with claim 17 wherein the polyalkene is polyethylene.

22. A method in accordance with claim 17 wherein the polyalkene is polypropylene.

* * * * *